United States Patent
Bouti

(10) Patent No.: US 7,467,940 B2
(45) Date of Patent: Dec. 23, 2008

(54) SYSTEM AND METHOD FOR JOINING NON-COMPATIBLE COMPONENTS

(75) Inventor: Abdeslam Bouti, Swanton, VT (US)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 237 days.

(21) Appl. No.: 11/551,425

(22) Filed: Oct. 20, 2006

(65) Prior Publication Data

US 2008/0092388 A1 Apr. 24, 2008

(51) Int. Cl.
*B29C 45/20* (2006.01)
(52) U.S. Cl. .................. 425/549; 264/328.15
(58) Field of Classification Search .............. 425/549; 264/328.15
See application file for complete search history.

(56) References Cited

U.S. PATENT DOCUMENTS 4,837,925 A * 6/1989 Gellert .................. 425/549
4,854,851 A * 8/1989 Gellert .................. 425/549
6,142,731 A 11/2000 Dewis et al.
6,609,902 B1 8/2003 Blais et al.
6,971,869 B2 12/2005 Olaru

FOREIGN PATENT DOCUMENTS

CA 2352040 A1 3/2002
DE 10037739 A1 2/2002

* cited by examiner

*Primary Examiner*—Tim Heitbrink

(57) ABSTRACT

An improved nozzle apparatus and method of manufacture are provided in which non-compatible components (such as a metallurgically non-weld-compatible nozzle tip and seal) may be secured/attached. For example, the apparatus and method may comprise securing a seal between a first portion of a nozzle tip and a retention ring. The retention ring may comprise a material that is weld-compatible with the nozzle tip and may be welded to the nozzle tip whereas the seal may be non-compatible with the nozzle tip. As a result, the materials of the nozzle tip and the seal may be chosen substantially without regard to their compatibility.

15 Claims, 7 Drawing Sheets

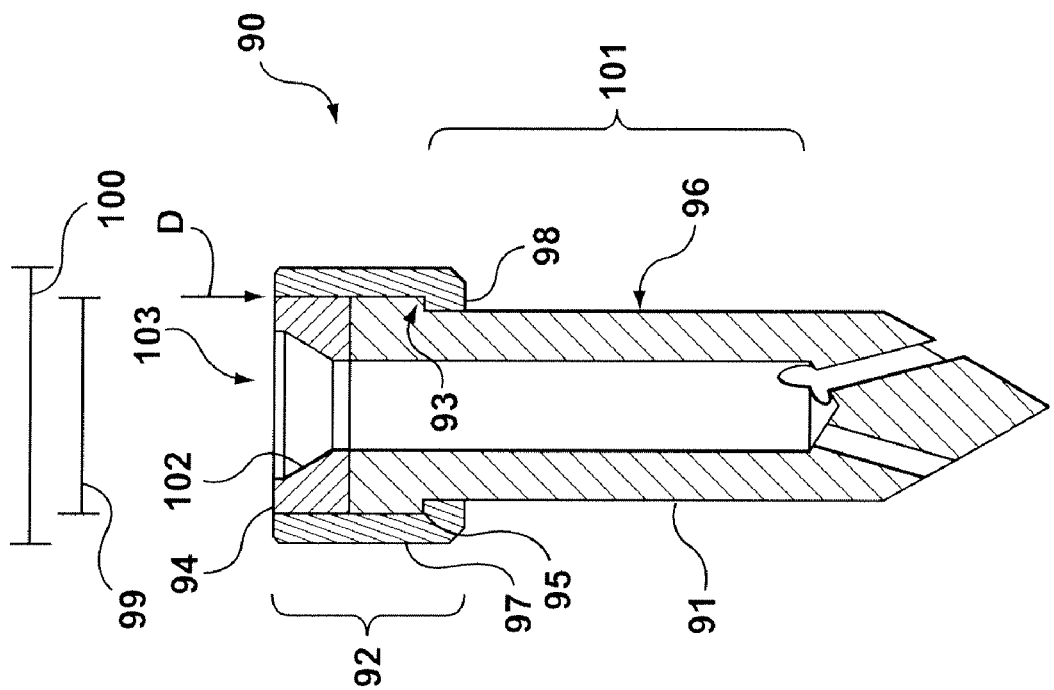
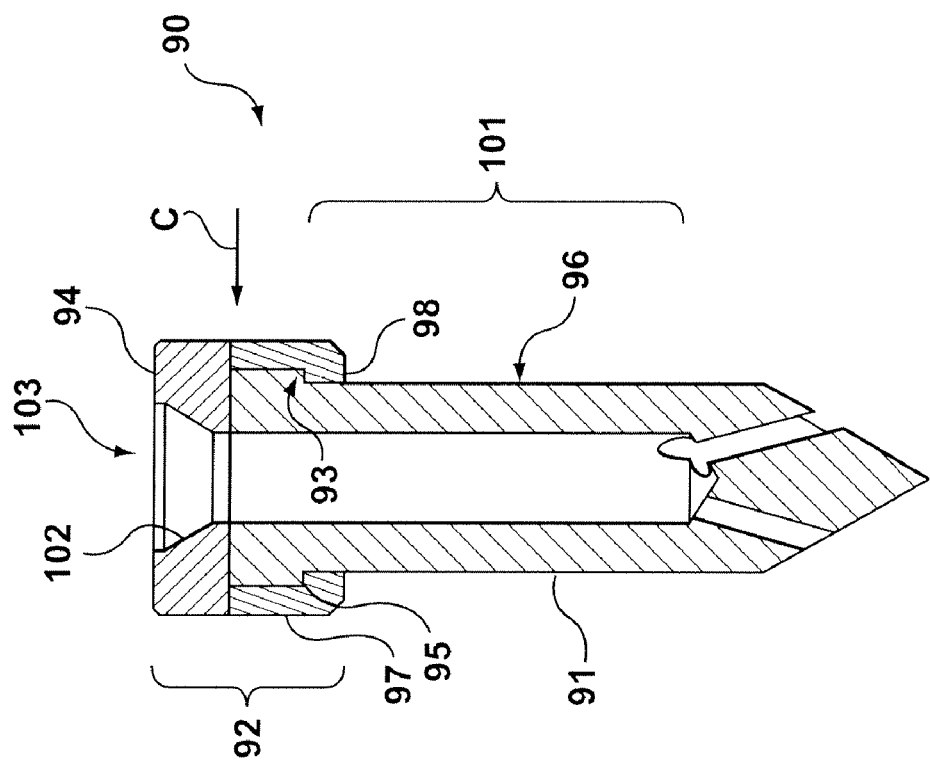

SYSTEM AND METHOD FOR JOINING NON-COMPATIBLE COMPONENTS

FIELD

The present invention relates generally to molding systems, and more particularly to a system and method of joining two or more non-compatible materials in a molding system.

BACKGROUND INFORMATION

Molding systems, for example hot runner systems, often include components that require the use of various parts having different mechanical and/or physical properties. By way of example only, a molding system may feature a nozzle comprising a nozzle housing and a nozzle tip configured to engage with a gate region of a mold. A heater may supply heat to the nozzle to prevent the resin in the passageway from solidifying. In order to maximize the heat transfer from the heater to the resin, the nozzle housing and tip may be made from a material having a relatively high thermal conductivity such as, but not limited to, a copper alloy.

The nozzle may also include a seal that may be secured to the nozzle tip which forms a seal between the nozzle tip and the gate region of the mold. During operation of the molding system, the nozzle tip may be repeatedly brought in and out of engagement with the mold. This movement may expose the seal to considerable wear/pressure. Additionally, the mold may be relatively cold compared to the nozzle. Accordingly, it is generally desirable to manufacture the seal from a relatively strong material having a relatively low thermal conductivity in order to prevent damage to the seal and to minimize the amount of heat transferred from the nozzle to the mold.

Unfortunately, the different desired properties of the nozzle tip and the seal may require the use of two different materials that may be metallurgically incompatible. For example, many copper alloys and stainless steels are not compatible for welding. Although it may be possible to secure these two materials together using a welding technique, it is very difficult and the resulting connection is generally weak and unreliable. An alternative method of joining the seal to the nozzle may include forming an interference fit or spraying a coating onto the nozzle to form the seal as described in U.S. Pat. No. 6,971,869 (which is fully incorporated herein by reference).

Accordingly, there exists a need for components of an injection molding system to have components (i.e., portions/locations) made of different materials in order to optimize desired material properties at the different portions/locations. There is also a need for a reliable and/or cost-effective process to permanently secure together two or more portions of injection molding system components having different material properties. The present disclosure provides such components and a manufacturing process for them.

It is important to note that the present disclosure is not intended to be limited to a system or method which must satisfy one or more of any stated objects or features of the present disclosure. It is also important to note that the present disclosure is not limited to the preferred, exemplary, or primary embodiment(s) described herein. Modifications and substitutions by one of ordinary skill in the art are considered to be within the scope of the present disclosure, which is not to be limited except by the following claims.

SUMMARY

In accordance with one aspect, there is provided a nozzle comprising nozzle body having a passageway configured to be in fluid communication with a source or resin and an exterior surface comprising a first shoulder extending generally outwardly from a first contact surface. A retention ring (comprising a first material that is weld-compatible with the nozzle body) may be disposed about a first portion of the exterior surface of the nozzle body and may extend generally outwardly from the nozzle body. The retention ring is welded to the first portion of the nozzle body. A seal (comprising a second material that is not weld-compatible with the nozzle body) may surround at least a portion of the contact surface of the nozzle body. The seal may substantially abut against at least a portion of the first shoulder and the retention ring such that seal substantially cannot move relative to the nozzle body. The seal and the contact surface of the nozzle body may form an interference fit.

The first portion of the nozzle body may also comprises a second retaining region. The second retaining region may include a second shoulder extending generally outwardly from a second contact surface of the nozzle body. An inner surface of the retention ring may be disposed about the second contact surface. The second shoulder may also comprise an outer diameter that is substantially the same as an inner diameter of the seal.

The nozzle body may optionally comprises a region of material disposed about an exterior surface of nozzle body proximate to an outlet of the nozzle body. This region may be substantially removed after the weld is formed between the retention ring and the nozzle body.

According to another aspect, there is provided a method comprising positioning a seal about an exterior surface of a nozzle body such that a first surface of the seal substantially abuts against a first shoulder extending generally outwardly from the nozzle body. The seal may include a material that is non-weld-compatible with the nozzle body. A retention ring may be positioned about the exterior surface of the nozzle body such that at least a portion of the retention ring substantially abuts against a second surface of the seal substantially opposite the first surface. The retention ring may be welded to the nozzle body, wherein the seal substantially cannot move relative to the nozzle body.

The nozzle body may be provided with a region of material disposed about an orifice of the nozzle tip. At least a portion of this region of material may be removed after welding the retention ring to the third portion of the nozzle tip. Additionally, a portion of the retention ring may be removed to form a desired shape after welding the retention ring to the nozzle tip. The retention ring may be positioned about a second shoulder extending generally outwardly from the exterior surface of the nozzle body such that at least a portion of the retention ring substantially abuts the second shoulder.

According to yet another aspect, there is provided a nozzle comprising a nozzle body. The nozzle body may include a tip region, a passageway configured to be in fluid communication with and downstream from a source of resin, and a first retaining region disposed about a first portion of an exterior surface of the nozzle body. The first retaining region may comprise a first contact surface and a first shoulder extending generally outwardly from the first contact surface.

A retention ring may be disposed about a second portion of the nozzle body between the first retaining region and the tip region. The retention ring comprises a material that is weld-compatible with the nozzle body and is welded to the nozzle body.

A seal may be disposed about at least a portion of the first contact surface and substantially abuts against at least a portion of the first shoulder and the retention ring. The seal may comprise an inner diameter that is smaller than an outer diameter of the retention ring and the first shoulder such that the seal substantially cannot move relative to the nozzle body.

According to another aspect, there is provided a first component of a molding system comprising a first shoulder extending generally outwardly from a first contact surface. A retention ring is disposed about a first portion of the exterior surface of the first component and extends generally outwardly from the first component. The retention ring comprises a material that is weld-compatible with the first component and is welded to the first component. A second component (comprising a second material that is not weld-compatible with the first component) surrounds at least a portion of the contact surface of the first component. The second component substantially abuts against at least a portion of the first shoulder and the retention ring such that second component substantially cannot move relative to the first component.

BRIEF DESCRIPTION OF THE DRAWINGS

Features and advantages of the claimed subject matter will be apparent from the following detailed description of embodiments consistent therewith, which description should be considered with reference to the accompanying drawings, in which:

FIG. 9 is a cross-sectional view of one embodiment of a nozzle tip having an integrated flange connection according to the present disclosure; and FIG. 10 is a cross-sectional view of another embodiment of a nozzle tip having an integrated flange connection according to the present disclosure.

DETAILED DESCRIPTION

In one aspect of the present disclosure, a first and at least a second component comprising materials that are not weld-compatible may be secured together by the introduction of a third component that is weld-compatible with at least one of the first two components. For the sake of clarity, the present disclosure will be described by way of an embodiment in which the components of the injection molding system comprise a nozzle assembly having a seal secured to an exterior surface of the nozzle tip which is configured to contact against a mold wherein the seal and the nozzle tip include non-weld-compatible materials. However, the present disclosure may be applied to secure any components of a molding system which are not weld-compatible with each other. Accordingly, the present disclosure is not limited to the described embodiments but only by the claims.

Figure 1:
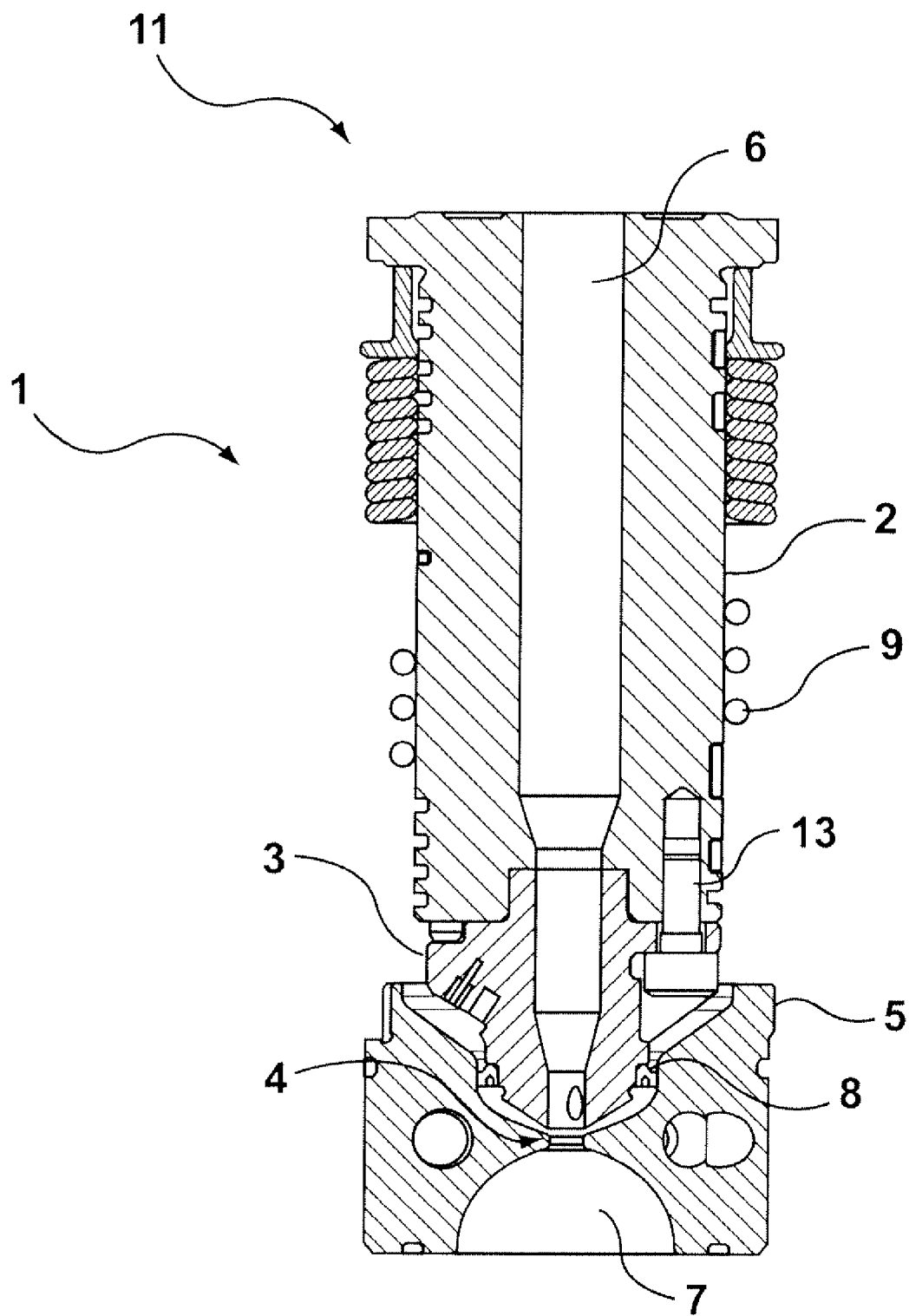
FIG. 1 is a cross-sectional view of one embodiment of a molding system according to the present disclosure.

One embodiment of a cross-section of a nozzle 1 and a mold 5 is shown in FIG. 1. The nozzle 1 may comprise either a valve gate nozzle or a thermal gate nozzle. According to one embodiment, the nozzle 1 may comprise a nozzle housing 2 having a generally cylindrical shape with a distal end 11 that may be configured to be secured to a source of resin (for example, but not limited to, a manifold of a hot runner system or the like which is not shown) and a nozzle tip 3 that may be configured to engage with a gate region 4 of a mold 5. Resin enters the nozzle 1 from the resin source and flows within a passageway 6 in the nozzle 1 though the gate region 4 of the mold 5 and ultimately into a mold cavity 7 (a portion of which is shown). A heater 9 (a portion of which is shown) may be wound around or otherwise disposed about at least a portion of the nozzle 1 and maintains the resin in the passageway 6 at a temperature sufficient to prevent the resin in the passageway 6 from solidifying. The heater 9 may be any type of heater such as, but not limited to, a resistive wire heater, sleeve heater, or the like.

Figure 2:
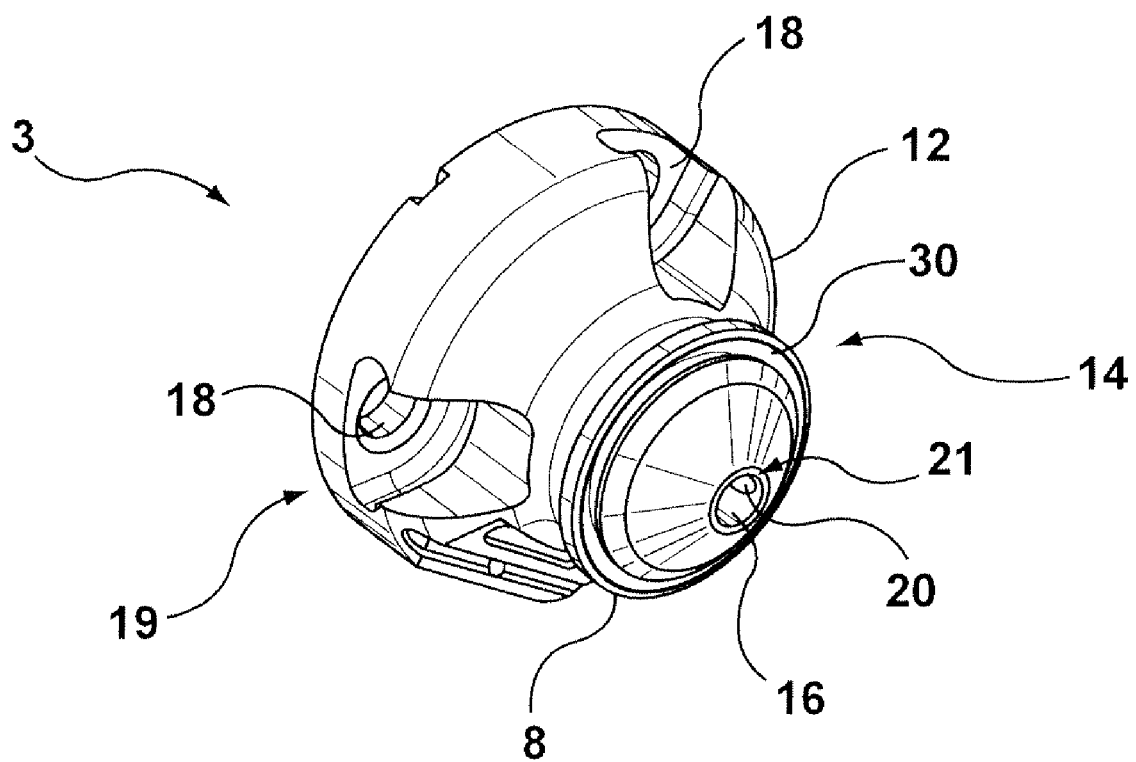
FIG. 2 is a perspective view of one embodiment of a nozzle tip according to the present disclosure.
Figure 3:
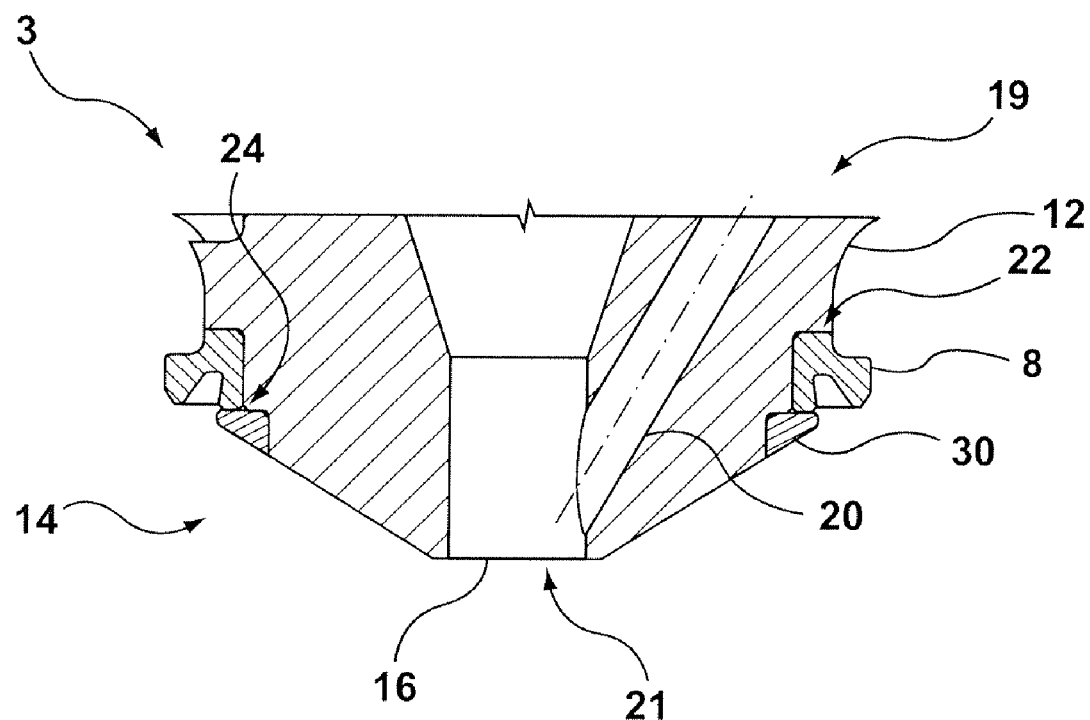
FIG. 3 is a cross-sectional view of one embodiment of a finished nozzle tip and seal according to the present disclosure.

Referring specifically to FIGS. 2 and 3, one embodiment of a nozzle tip 3 is shown. While the nozzle tip 3 may be formed as a single, unitary component with the nozzle housing 2 (FIG. 1), in the preferred embodiment the nozzle tip 3 may be removably secured to the nozzle housing 2 in any fashion known to those skilled in the art. For exemplary purposes only, the nozzle tip 3 may be removably secured to the nozzle housing 2 by way of one or more fasteners 13 (FIG. 1) disposed through one or more apertures 18 in the base 19 of the nozzle tip body 12 which engage the nozzle housing 2. Alternatively, the nozzle tip 3 may threadably engage the nozzle housing 2.

The nozzle tip 3 may also include a tip passageway 16 that is configured to be in fluid communication with the passageway 6 (FIG. 1) of the nozzle housing 2 for transporting the resin through the nozzle 1 (FIG. 1). Optionally, a valve stem or the like (not shown) may be moveably disposed within a stem passageway 20 for selectively opening and closing the outlet 21 of the tip passageway 16 as is well known. While the nozzle tip 3 shown is a valve gate nozzle tip, this is not a limitation of the present disclosure and the nozzle tip 3 may also include a thermal gate nozzle tip 3. The nozzle tip 3 may be made from a material that has a relatively high thermal conductivity to reduce the losses in the heat transfer from the heater 9 (FIG. 1) to the resin in the tip passageway 16. For example, the nozzle tip 3 may include, but is not limited to, copper alloys including Be—Cu (beryllium-copper), beryllium-free, aluminum or aluminum-based alloys, molybdenum or suitable molybdenum alloys, H13 steel, mold steel or the like.

The nozzle tip 3 may also include a seal 8 that is configured to contact the mold 5 (FIG. 1), preferably proximate the gate region 4 as shown in FIG. 1, and to form a seal that inhibits resin leakage between the nozzle tip 3 and the gate region 4 of the mold 5. The seal 8 may have physical properties that are different from the desired physical properties of the nozzle tip body 12 depending on the intended application of the nozzle 1. For example, it may be desirable for the seal 8 to include a wear resistant material that is also comparatively less thermally conductive than the material of the nozzle tip body 12. While not a limitation of the present disclosure, the seal 8 may be made from titanium, H13, stainless steel, mold steel or chrome steel, ceramics and plastics. Other suitable materials for the mold seal 8 are disclosed in U.S. Pat. No. 5,879,727 to Puri, which is hereby incorporated by reference. Puri discloses such materials for use as an insulative layer for a nozzle. In order to achieve the desired physical properties for the nozzle tip 3 and the seal 8, it may be desirable to manufacture the nozzle tip 3 and the seal 8 from two different materials that may be either weld incompatible or may form relatively weak, difficult, or unreliable bonds.

According to one embodiment of the present disclosure, the seal 8 may be secured to the nozzle body 12 by entrapping the seal 8 between a retaining region 22 of the nozzle body 12 and a retention ring 30 rather than welding the seal 8 directly to the nozzle body 12. Consequently, the seal 8 may be permanently secured/attached to the nozzle body 12 without welding the seal 8 directly to the nozzle body 12. As a result, both the nozzle body 12 and the seal 8 may be manufactured from a broader range of materials selected to have the desired physical properties for the particular intended application generally without concern of their welding compatibility while still providing a strong, reliable attachment.

Figure 4:
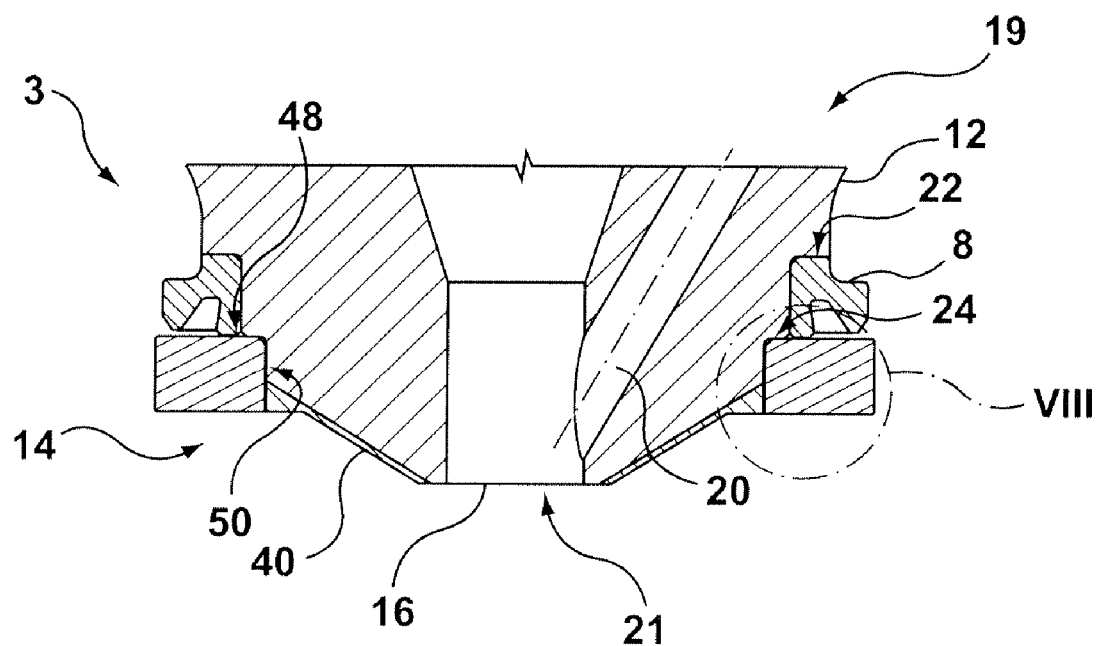
FIG. 4 is a cross-sectional view of one embodiment of an assembled nozzle tip and seal prior to final detailing according to the present disclosure.
Figure 5:
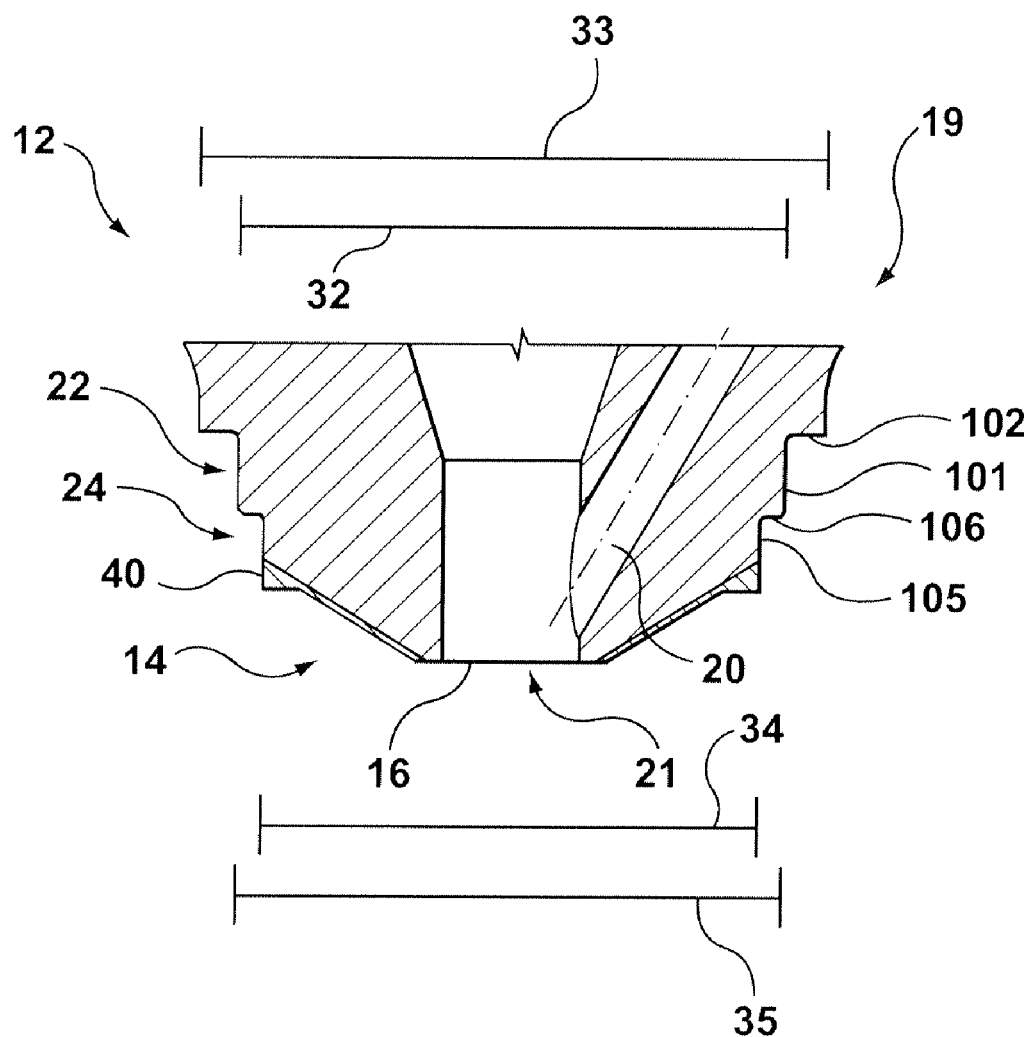
FIG. 5 is a cross-sectional view of one embodiment of a nozzle body without the seal or retention ring.

Referring specifically to FIG. 5, a cross-section of one embodiment of a nozzle body 12 according to the present disclosure is shown. The nozzle body 12 may include a first and a second retaining region 22, 24 disposed circumferentially about an outer surface of the nozzle body 12 against which the seal 8 and the retention ring 30 may contact, respectively, as shown in FIGS. 3 and 4. The first retaining region 22 may include a first surface 101 disposed substantially along the longitudinal axis of the nozzle body 12 and a first shoulder 102. The first shoulder 102 may extend substantially outwardly from the first surface 101 along a perimeter or circumference of the nozzle body 12 and may have an outer diameter 33 that is larger than an inner diameter 32 of the first surface 101. While the first shoulder 102 is shown extending generally perpendicularly outwardly from the first surface 101, this is not a limitation of the present disclosure and other shapes (such as, but not limited to, substantially tapered or conical shapes) are also possible.

The second retaining region 24 may include a second surface 105 disposed substantially along the longitudinal axis of the nozzle body 12 and a second shoulder 106. The second shoulder 106 may extend substantially outwardly from the second surface 105 along a perimeter or circumference of the nozzle body 12 and may have an outer diameter 35 that is larger than an inner diameter 34 of the second surface 105. While the second shoulder 106 is shown extending generally perpendicularly outwardly from the second surface 106, this is not a limitation of the present disclosure and other shapes (such as, but not limited to, substantially tapered or conical shapes) are also possible.

The nozzle body 12 may also include a tip region 14 that may optionally be formed with a region 40 of additional material disposed between the second retaining region 24 and the outlet 21 of the tip passageway 16. The region 40 may be formed from the same material as nozzle body 12 during the manufacturing of the nozzle body 12 or added separately. Alternatively, the region 40 may comprise a material that is different from, and metallurgically compatible with, the material of the nozzle body 12 which may be added after the manufacturing of the nozzle body 12. As will be discussed further below, the region 40 may be substantially removed after the welding of the retention ring 30.

Figure 6:
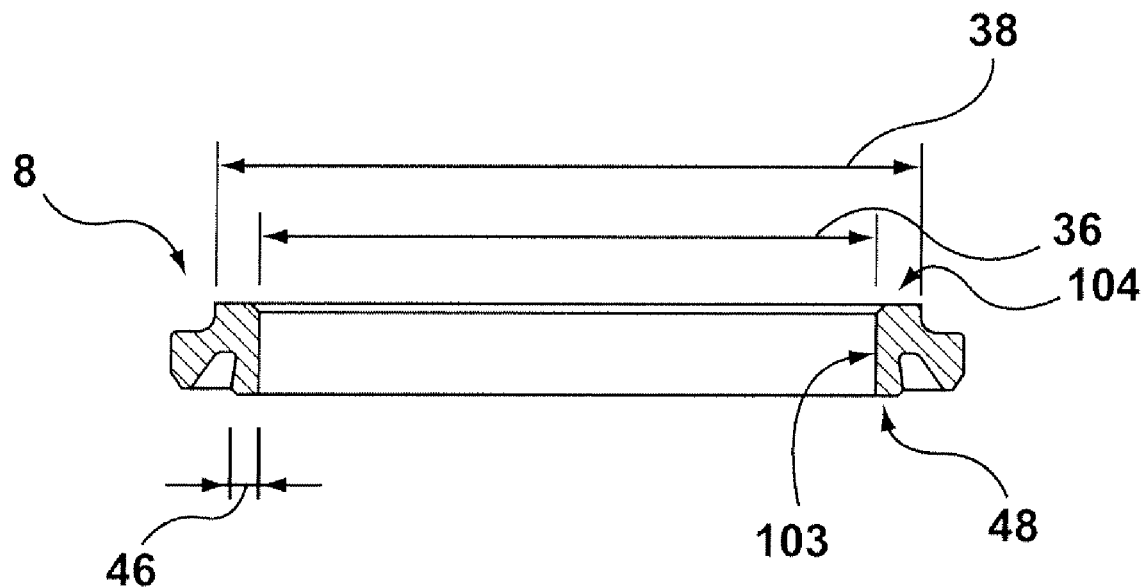
FIG. 6 is a cross-sectional view of one embodiment of a seal according to the present disclosure.

Referring specifically to FIGS. 4 and 6, one embodiment of the seal 8 is shown. While an illustrative example of one embodiment of a seal 8 is shown, the seal 8 may comprise any seal design known to those skilled in the art. The exact size, shape, and configuration of the seal 8 may depend upon the intended application and is within the knowledge of one of ordinary skill in the art. The seal 8 may comprise an inner surface 103 having an inner diameter 36 that may be substantially the same as the inner diameter 32 (FIG. 5) of the first retaining region 22 as shown in FIG. 4. In the preferred embodiment, the inner surface 103 of the seal 8 and the first surface 101 (FIG. 5) of the first retaining region 22 may form an interference fit when assembled.

The seal 8 may also include an outer surface 104 having an outer diameter 38 that is larger than the inner diameter 36 of the seal 8. The outer surface 104 of the seal 8 may be sized and shaped to substantially abut against at least a portion of the first shoulder 102 (FIG. 5) of the first retaining region 22 as shown in FIGS. 3 and 4 such that the first shoulder 102 prevents the seal 8 from moving towards the base 19 of the nozzle tip 3.

Figure 7:
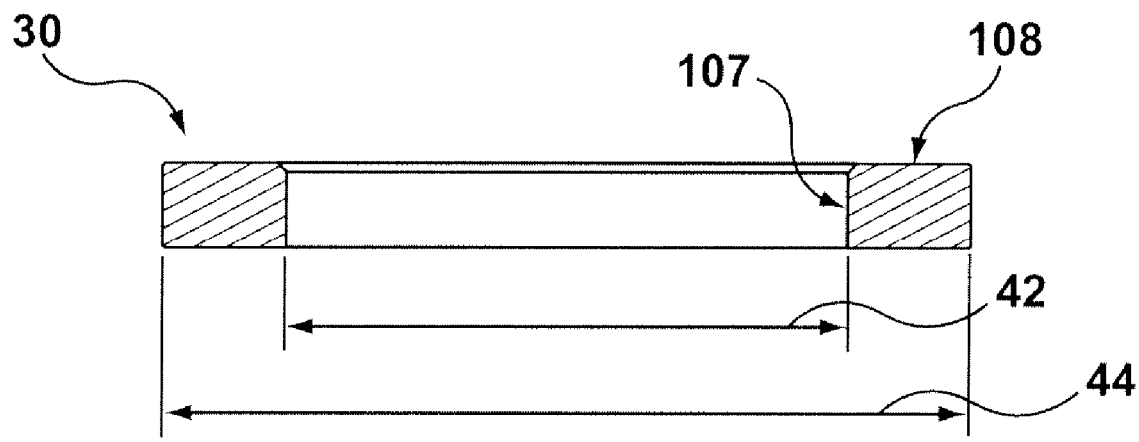
FIG. 7 is a cross-sectional view of one embodiment of a retention ring according to the present disclosure.

Referring now to FIGS. 4 and 7, one embodiment of the retention ring 30 is shown. The retention ring 30 may be manufactured from any material that is compatible for welding with the material of the nozzle body 12. As used herein, two materials that have weld compatibility are intended to mean materials that meet the welding-standards (i.e., codes, specifications, recommended practices, classifications, methods, and guides) of at least one of the various standards organizations such as ASTM International, American Welding Society (AWS), International Organization for Standardization (ISO), and the like. Conversely, as used herein materials are not weld-compatible if they do not meet at least one of these welding-standards. While the retention ring 30 and the nozzle body 12 may comprise the same material, the retention ring 30 and the nozzle body 12 may also comprise different materials as long as the two materials are compatible for welding. While not a limitation of the present disclosure unless specifically claimed as such, the retention ring 30 may comprise, but is not limited to, copper alloys including Be—Cu (beryllium-copper), beryllium-free copper, aluminum or aluminum-based alloys, molybdenum or suitable molybdenum alloys, H13 tool steel, mold steel or the like.

The retention ring 30 may include contact surfaces 107, 108. The first contact surface 107 may have an inner diameter 42 that is substantially the same size as the inner diameter 34 (FIG. 5) of the second retaining region 24 such that the retention ring 30 fits over at least a portion of the second surface 105 of the second retaining region 24 as shown in FIGS. 3 and 4. According to one embodiment, the second surface 105 (FIG. 5) of the second retaining region 24 and the first contact surface 107 of the retention ring 30 may form an interference fit.

The second contact surface 108 of the retention ring 30 may also include an outer diameter 44 that is larger than the inner diameter 36 (FIG. 6) of the seal 8. According to one embodiment, at least a portion of the second contact surface 108 of the retention ring 30 substantially abuts against at least a portion of the second shoulder 106 (FIG. 5) of the second retaining region 24 as shown in FIGS. 3 and 4. Additionally, at least a portion of the second contact surface 108 may be sized and shaped to substantially abut against the lower surface 48 of the seal 8 thereby preventing the seal 8 from moving towards the tip 14 of the nozzle tip 3. According to one embodiment, the difference between the inner and outer diameters 42, 44 of the retention ring 30 is greater than, and preferably substantially greater than, the thickness 46 (FIG. 6) of the lower region 48 of the seal 8.

To assemble the nozzle tip 3, the seal 8 may be disposed about the first retaining region 22 of the nozzle body 12 such that the outer surface 104 (FIG. 6) of the seal 8 substantially abuts the first shoulder 102 (FIG. 5) of the first retaining region 22 as shown in FIGS. 3 and 4. The first shoulder 102 prevents the seal 8 from moving towards the base 19 of the nozzle tip 3. Next, the retention ring 30 may be disposed about the second retaining region 24 of the nozzle body 12 such that the second contact surface 108 of the retention ring 30 substantially abuts the lower surface 48 of the seal 8 thereby preventing the seal 8 from moving towards the tip 14 of the nozzle tip 3.

Figure 8:
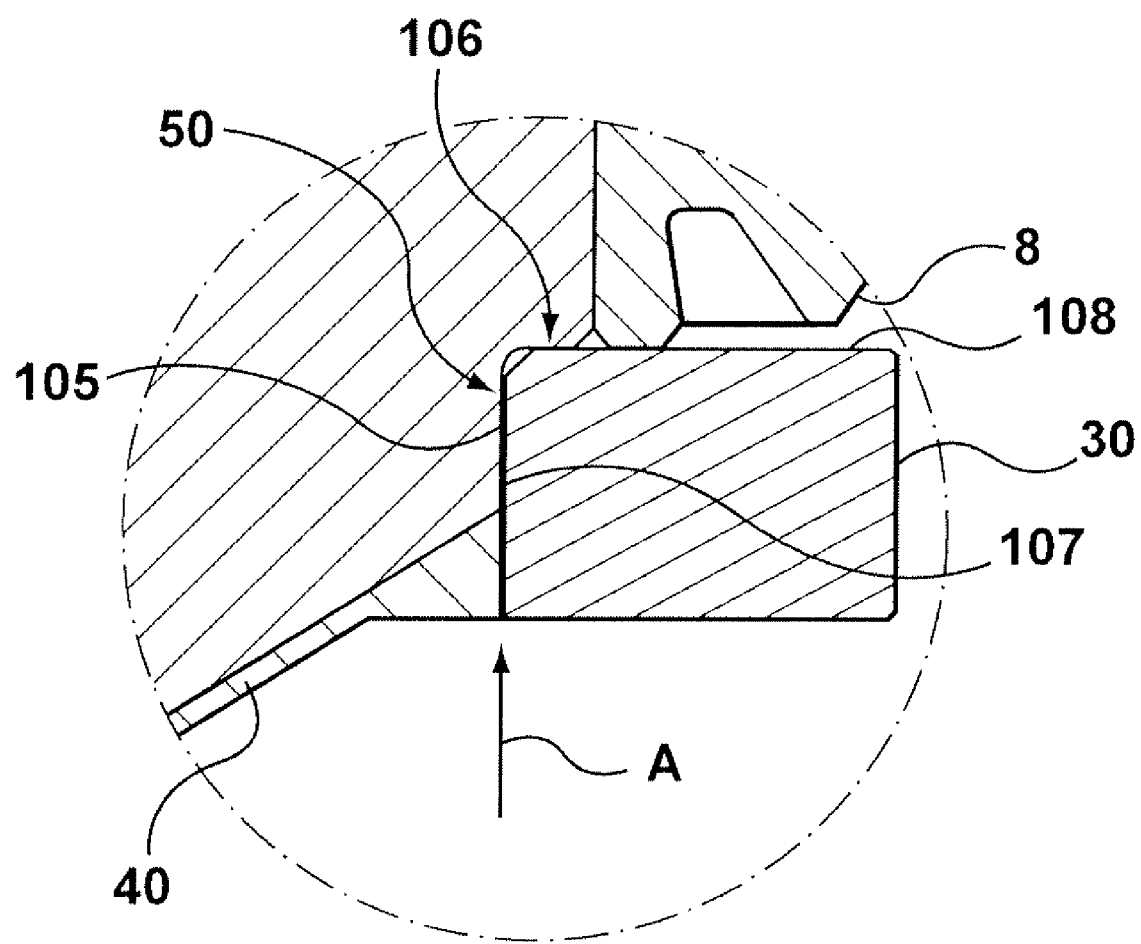
FIG. 8 is a close-up of region VIII of FIG. 4 according to the present disclosure.

Once the seal 8 and the retention ring 30 are in place as shown in FIG. 4, at least a portion of the interface 50 between the first contact surface 107 of the retention ring 30 and the second surface 105 of the second retaining region 24 of the nozzle body 12 may be welded along the direction of arrow A as shown in FIG. 8. According to one embodiment, the retention ring 30 is initially welded to both the nozzle body 12 as well as the region 40. However, in the embodiment in which the nozzle tip 3 does not include the region 40, the retention ring 30 may be welded directly to the nozzle body 12. The weld may be formed using any known welding technique such as, but not limited to, electron or laser beam welding. Alternatively, the retention ring 30 may be secured to the nozzle body 12 using by soldering and/or brazing.

After the retention ring 30 is welded to the nozzle body 12, the first shoulder 102 and the welded retention ring 30 secure the seal 8 in place such that the seal 8 substantially cannot move relative to the nozzle tip 3. Because the retention ring 30 and the nozzle body 12/region 40 are weld-compatible, a strong and reliable weld can be formed substantially irrespective of the weld compatibility of the nozzle body 12 and the seal 8. Consequently, the materials chosen for the nozzle body 12 and the seal 8 can be optimized for the intended application. Additionally, since the seal 8 does not need to be welded to the nozzle body 12, damage to the seal 8 (either physical damage or metallurgical) can be avoided.

Optionally, the retention ring 30 and/or the region 40 of the nozzle body 12 may be milled to form the finished product as shown in FIG. 3 after welding. A benefit of milling the retention ring 30 and the nozzle body 12/region 40 after welding is that the weld may be cleaned up thereby resulting in a smoother exterior surface. Alternatively, the ring seal 30 and the nozzle body 12 may be formed substantially in their final form prior to welding.

According to another embodiment, the present disclosure features a nozzle tip 90, FIGS. 9 and 10. The nozzle tip 90 may comprise a body portion 91 comprising a relatively high thermally conductive material as described above such as, but not limited to, a copper alloy or the like. The body portion 91 may comprise a retaining region 93. The retaining region 93 may comprise a shoulder 95 extending generally outwardly from the exterior surface 96 of the body portion 91.

The nozzle tip 90 may also comprise an integrated connection flange 92 configured to be disposed about at least a portion of the exterior surface 96 of the body portion 91. The connection flange 92 may be configured to form a connection with the nozzle body (not shown) of a nozzle and may comprise a relatively high strength material as described above (for example, but not limited to, high strength steel or the like) such that a secure connection can be made.

The integrated connection flange 92 may comprise a flange adapter 94 and a retainer ring 97. The flange adapter 94 may comprise a material having a relatively high strength material as described above such as, but not limited to, high strength steel or the like and may be configured to substantially abut against at least a portion of a nozzle body (not shown) of a nozzle. A resin pathway 103 may be disposed through the nozzle tip 90 for communicating resin from the nozzle and may include a tapered inlet 102.

The integrated connection flange 92 may optionally include a threaded region (either on the interior or exterior surface of the integrated connection flange 92) for forming a threaded connection with the nozzle body. Alternatively, the integrated connection flange 92 may form a connection with the nozzle body by way of a tip retainer (not shown) as described in U.S. Pat. No. 6,609,902 to Blais et al. (which is fully incorporated herein by reference).

The retainer ring 97 may be sized and shaped to substantially abut against at least a portion of the retaining region 93 of the body portion 91. The retainer ring 97 may comprise any material that is weld-compatible with the flange adapter 94 and may include an inwardly directed flange 98 substantially abutting against the shoulder 95 of the retaining region 93. For example, the inwardly directed flange 98 may have an inner diameter 99 that is less than an outer diameter 100 of the shoulder 95. The inner diameter 99 may optionally be substantially the same as the diameter of the shank region 101 of the body portion 91.

According to one embodiment, the retainer ring 97, FIG. 9, may be welded to the flange adapter 94 by welding substantially circumferentially around the integrated connection flange 92 in the direction of arrow C. Alternatively, the retainer ring 97, FIG. 10, may welded to the flange adapter 94 by welding substantially circumferentially along the longitudinal axis L of the integrated connection flange 92 in the direction of arrow D. In either embodiment, once the retainer ring 97 and the flange adapter 94 are welded together, the body portion 91 is substantially entrapped between the flange adapter 94 and the retainer ring 97 such that the integrated connection flange 92 is substantially permanently connected/secured to the body portion 91 and the body portion 91 substantially cannot move relative to the integrated connection flange 92. It should be noted that the retainer ring 97 and the flange adapter 94 may be welded together and do not have to be welded to the body portion 91. As such, the integrated connection flange 92 may comprise a material that is not weld-compatible with the body portion 91.

Accordingly, the present disclosure features an injection molding system (such as, but not limited to, nozzle tips and seals) that comprises portions/locations made of different materials in order to optimize desired material properties at the different portions/locations. The present disclosure also features a reliable and/or cost-effective process to permanently join/attach together two or more portions of injection molding system components having different material properties. While the present disclosure has been described with respect to a nozzle, this is not a limitation of the present disclosure. The present disclosure may be utilized on virtually any component of a molding system where non-weld-compatible materials need to be secured together As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with breadth to which they are fairly, legally and equitably entitled.

The invention claimed is:

1. A nozzle comprising:
   a nozzle body having a passageway configured to be in fluid communication with a source or resin and an exterior surface comprising a first shoulder extending generally outwardly from a first contact surface;
   a retention ring disposed about a first portion of said exterior surface of said nozzle body and extending generally outwardly from said nozzle body, said retention ring comprising a first material that is weld-compatible with said nozzle body;
   a weld between said retention ring and said first portion of said nozzle body; and
   a seal comprising a second material that is not weld-compatible with said nozzle body, said seal surrounding at least a portion of said contact surface of said nozzle body, wherein said seal substantially abuts against at least a portion of said first shoulder and said retention ring such that seal substantially cannot move relative to said nozzle body.

2. The nozzle of claim 1 wherein said seal and said contact surface of said nozzle body form an interference fit.

3. The nozzle of claim 2 wherein said nozzle body and said retention ring comprises different materials.

4. The nozzle of claim 1 wherein said first portion of said nozzle body further comprises:
   a second retaining region having a second shoulder extending generally outwardly from a second contact surface of said nozzle body, wherein an inner surface of said retention ring is disposed about said second contact surface.

5. The nozzle of claim 4 wherein said second shoulder further comprises:
   an outer diameter that is substantially the same as an inner diameter of said seal.

6. The nozzle of claim 1 wherein said nozzle body further comprises a region of material disposed about an exterior surface of nozzle body proximate an outlet of said nozzle body, wherein said region may be substantially removed after said weld is formed between said retention ring and said nozzle body.

7. A nozzle comprising:
   a nozzle body comprising:
      a tip region;
      a passageway configured to be in fluid communication with and downstream from a source of resin; and
      a first retaining region disposed about a first portion of an exterior surface of said nozzle body, said first retaining region comprising a first contact surface and a first shoulder extending generally outwardly from said first contact surface;
   a retention ring disposed about a second portion of said nozzle body between said first retaining region and said tip region, said retention ring comprising a material that is weld-compatible with said nozzle body;
   a weld between said retention ring and said nozzle body; and
   a seal disposed about at least a portion of said first contact surface and substantially abutting against at least a portion of said first shoulder and said retention ring, wherein said seal comprises an inner diameter that is smaller than an outer diameter of said retention ring and said first shoulder such that said seal substantially cannot move relative to said nozzle body.

8. The nozzle of claim 7 wherein said nozzle body and said seal comprise a second and a third material, respectively, wherein said third material is not weld-compatible with said first material.

9. The nozzle of claim 8 wherein said first and said second materials are different.

10. The nozzle of claim 8 wherein said first and said second materials are substantially the same.

11. The nozzle of claim 7 wherein said second portion of said nozzle body further comprises:
    a second retaining region having a second shoulder extending generally outwardly from a second contact surface of said nozzle body.

12. The nozzle of claim 11 wherein said second shoulder further comprises:
    an outer diameter that is substantially the same as said inner diameter of said seal.

13. The nozzle of claim 12 wherein at least a portion of an inner surface of said retention ring is disposed about said second contact surface of said second retaining region and wherein at least a portion of said retention ring substantially abuts against said second shoulder of said second retaining region.

14. The nozzle of claim 7 wherein said nozzle body further comprises a region of material disposed about an exterior surface of said tip region between said second portion of said nozzle body and an outlet of said passageway, wherein said region may be substantially removed after said weld is formed between said retention ring and said nozzle body.

15. A device comprising:
    a nozzle body portion comprising an exterior surface having a first shoulder extending generally outwardly from said exterior surface;
    a retention ring disposed about said exterior surface of said nozzle body portion proximate said first shoulder and extending generally outwardly from said nozzle body portion;
    a flange adapter comprising a material that is weld-compatible with said retention ring and not weld-compatible with said nozzle body portion, said flange adapter surrounding at least a portion of said nozzle body portion proximate a first end of said nozzle body portion; and
    a weld between said retention ring and said flange adapter, wherein said flange adapter and said retention ring substantially surround at least a portion of said first shoulder such that said nozzle body portion substantially cannot move relative to said flange adapter and said retention ring.

* * * * *